United States Patent
Day et al.

(10) Patent No.: US 8,120,612 B2
(45) Date of Patent: *Feb. 21, 2012

(54) INTELLIGENT VIDEO GRAPHICS SWITCHER

(75) Inventors: Don Day, Oakland, CA (US); David Haycock, Alameda, CA (US)

(73) Assignee: RGB Spectrum, Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/006,820

(22) Filed: Jan. 14, 2011

(65) Prior Publication Data

US 2011/0109805 A1    May 12, 2011

Related U.S. Application Data

(63) Continuation of application No. 11/522,057, filed on Sep. 15, 2006, now Pat. No. 7,893,941.

(51) Int. Cl.
*G06F 13/14* (2006.01)
*G06F 13/00* (2006.01)

(52) U.S. Cl. ......... 345/520; 710/305; 710/316; 710/317

(58) Field of Classification Search .................. 345/520; 709/220–229; 710/305, 316, 317
See application file for complete search history.

(56) References Cited

U.S. PATENT DOCUMENTS

| | | | |
|---|---|---|---|
| 7,088,398 B1 * | 8/2006 | Wolf et al. | 348/423.1 |
| 7,893,941 B2 | 2/2011 | Day et al. | |
| 2006/0123182 A1 * | 6/2006 | Sandulescu et al. | 710/316 |
| 2006/0143679 A1 * | 6/2006 | Yamada et al. | 725/131 |

OTHER PUBLICATIONS

Techex Product Information, "Analog Way—Graphics Switcher," copyrighted 2001, downloaded from www.techex.co.uk, 1 page.
Datapath Product Information, "VisionSwitch—PCI Plug-In Video Switch," downloaded Apr. 18, 2007, from www.datapath.co.uk, 4 pages.
Office Action mailed Oct. 6, 2009, for U.S. Appl. No. 11/522,057.
Final Office Action mailed Apr. 13, 2010, for U.S. Appl. No. 11/522,057.
Notice of Allowance mailed Oct. 19, 2010, for U.S. Appl. No. 11/522,057.

\* cited by examiner

*Primary Examiner* — Hau Nguyen
(74) *Attorney, Agent, or Firm* — Kwan Intellectual Property Law

(57) ABSTRACT

Methods and apparatus are provided for efficiently and intelligently communicating characteristic information in video graphics switcher environments. An intelligent video graphics switcher obtains display device characteristic information associated with multiple display devices and maintains updated characteristic information. When an event such as a connection/disconnection or switching event occurs between the video graphics switcher and a display device, the characteristic information is communicated to an appropriate host by triggering a connection/disconnection event with the host.

23 Claims, 8 Drawing Sheets

| Display Device Characteristic Information 501 ||
|---|---|
| Header Information 501 | Serial Number 503 |
| Version/Revision Number 505 | Display Parameters 507 |
| Image Size 511 | Power Management Support 513 |
| Chroma Information 515 ||
| Established Timing 517 ||
| Descriptor Block 521 ||
| Supported Video Modes 523 ||
| Display Device Manufacturer 525 ||
|  ||

Figure 5

| Mapping Table 601 | | |
|---|---|---|
| Host 611 | Display Device 621 | Memory Address Range 631 |
| Host 613 | Display Device 623 | Memory Address Range 633 |
| Host 615 | Display Device 625 | Memory Address Range 635 |
| Host 617 | Display Device 627 | Memory Address Range 637 |
| Host 619 | Display Device 629 | Memory Address Range 639 |

Figure 6

INTELLIGENT VIDEO GRAPHICS SWITCHER

CROSS-REFERENCE TO RELATED APPLICATION

This application is a continuation of and claims priority from U.S. patent application Ser. No. 11/522,057 (RG-BSP001), filed Sep. 15, 2006, titled "INTELLIGENT VIDEO GRAPHICS SWITCHER," all of which is incorporated herein by this reference for all purposes.

BACKGROUND OF THE INVENTION

1. Field of the Invention

The present invention relates to video graphics switchers. More specifically, the techniques of the present invention provide mechanisms for efficiently communicating characteristic information between display devices and hosts through a switcher.

2. Description of Related Art

Many conventional processing, multimedia, and control systems include a host connected to a display device. Any mechanism that operates as a source of video data is referred to herein as a host. Some examples of hosts include receivers, client computers, set top boxes, servers, etc. Any mechanism that visually presents the video data is referred to herein as a display device. Some of examples of display devices include monitors, displays such as flat panel displays or liquid crystal displays (LCDs), and projectors. Conventional systems provide somewhat limited mechanisms for hosts and displays to communicate information characterizing display devices and hosts, particularly when hosts and display devices are connected in more sophisticated arrangements through switching systems. Parameter or configuration information associated with a display device is referred to herein as information characterizing a display device or display device characteristic information. Examples of such information include resolution, vertical and horizontal frequency, aspect ratio, power management support, manufacturer code, etc. The information about the display device allows a host to more effectively use the display device.

In a simple case, a single host is a connected to a single display device. One technique that allows a host to determine characteristics of the display device involves connecting a predetermined number of pins to ground. Based on the number of pins connected to ground, a host could determine limited characteristic information associated with a display device. In another simple case, polarities associated with particular bits are flipped to communicate basic information. However, neither of these techniques could provide robust characteristic information.

The Extended Display Identification Data (EDID) format was developed by the Video Electronics Standards Association (VESA) to provide a data structure for a display device to communicate robust characteristic information to a host. The EDID structure allows a host and an associated graphics card to determine what type of display device the host is connected to. EDID includes parameters for communicating product serial numbers, video input types, maximum image sizes, phosphor or filter type, display gamma, chroma information, along with resolution, and frequency, etc.

However, mechanisms for communicating video graphic information such as EDID structures remain limited, particularly in video graphics switcher environments where multiple hosts can be dynamically connected to multiple display devices in a variety of arrangements. Consequently, the techniques of the present invention provide mechanisms for efficiently and intelligently communicating characteristic information in video graphics switcher environments.

SUMMARY OF THE INVENTION

Methods and apparatus are provided for efficiently and intelligently communicating characteristic information in video graphics switcher environments. An intelligent video graphics switcher obtains display device characteristic information associated with multiple display devices and maintains updated characteristic information. When an event such as a hotplug or switching event occurs between the video graphics switcher and a display device, the characteristic information is communicated to an appropriate host by triggering a hotplug event with the host.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 5 is a diagrammatic representation showing display device characteristic information.

FIG. 6 is a diagrammatic representation showing a mapping table.

DETAILED DESCRIPTION OF SPECIFIC EMBODIMENTS

Figure 1:
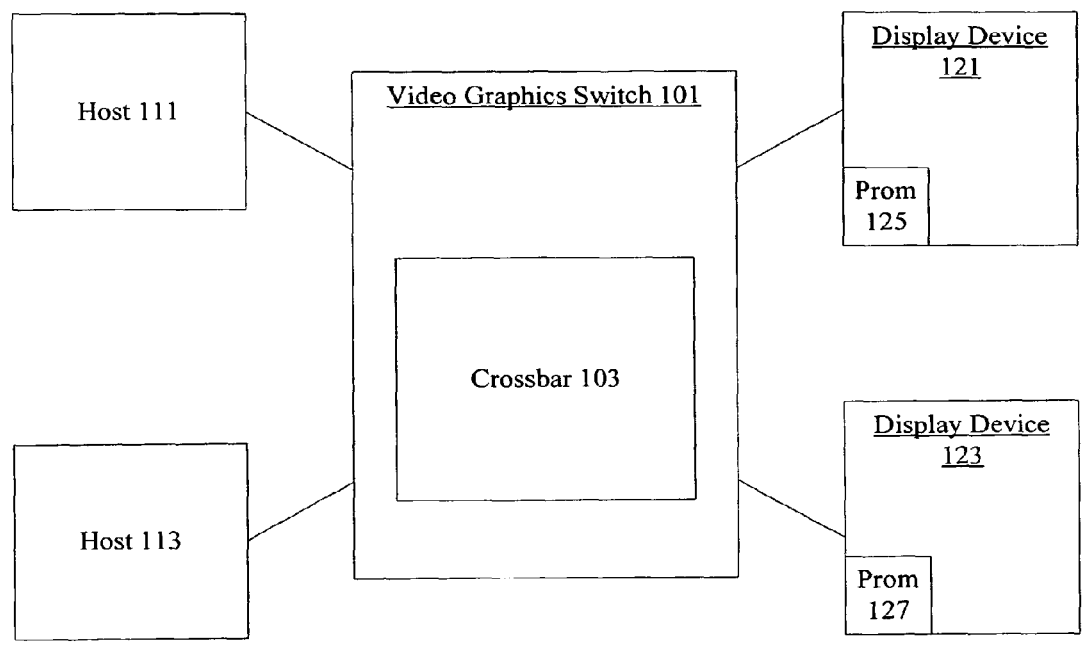
FIG. 1 is a diagrammatic representation showing a video graphics switcher.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the Digital Visual Interface (DVI) and the High-Definition Multimedia Interface (HDMI) connection mechanisms. However, it should be noted that the techniques and mechanisms of the present invention can be used with a variety of digital and multimedia interfaces that may or may not be compatible with DVI and/or HDMI. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a controller or a processor may be used in a variety of contexts. However, it will be appreciated that multiple controllers or processors can also be used while remaining within the scope of the present invention.

A video graphics system with a switching subsystem or a video graphics switcher connects multiple hosts to multiple display devices in dynamic, user configurable patterns. A video graphics system includes input interfaces connected to hosts and output interfaces connected to display devices. A typical video graphics switcher provides only basic functionality and merely transfers graphical data and video from hosts to connected display devices.

Several video interfaces incorporate a channel configured to provide information about a display to a host. For example, interfaces such as Video Graphics Adapter (VGA), Digital Visual Interface (DVI), and High Definition Multimedia Interface (HDMI) include a Display Data Channel (DDC) that allows a host to read an Extended Display Identification Data (EDID) construct from a display device. The EDID data structure includes information characterizing a display device. The information may include resolution, refresh rates, chroma information, power management support, etc.

A typical video graphics switcher does not pass a display data channel. Video interfaces do not have integrated capabilities allowing a video graphics switcher to provide hosts with display data after a switching event. In many instances, a switching event does not trigger any activity on the part of the host or display device. Each video graphics switcher output interface does not have any mechanism to read data such as an EDID data structure from an attached display device. Each video graphics switcher input interface does not have EDID information that can be read by an attached host. In some instances, it is possible to provide a default EDID Programmable Read Only Memory (PROM) at each video graphics input interface that does not reflect the real capabilities of the current connection or connections.

Consequently, the techniques and mechanisms of the present invention provide a video graphics switcher that conveys accurate and dynamically updated display characteristic information associated with a display device to connected hosts. The display characteristic information is obtained by the video graphics switcher and provided to the appropriate hosts using pseudo PROMs that would be read as display device PROMs by a host. EDID information at the video graphics switcher output interfaces can be obtained at system power-up. The information can be used to populate EDID memories at the video graphics switcher input interfaces according to a maintained connection pattern.

Any connection or disconnection event between a video graphics switcher and a display device causes a corresponding EDID entry to be reloaded. Any connection or disconnection event is referred to herein as a hotplug event. One example of a hotplug event is a DVI Hotplug event. EDID memory contents at the video graphics switcher input interface are updated upon detecting a connection or disconnection event. Similarly, any change in connection pattern between hosts and display devices causes corresponding EDID entries to be reloaded. Any change in connection pattern between hosts and display devices at a video graphics switcher is referred to herein as a switching event. Consequently, EDID memory contents are updated upon detecting either a hotplug event or a switching event.

Many video interfaces such as DVI do not provide a standardized mechanism for triggering a host to obtain new display characteristic information after a switching event. However, the techniques and mechanisms of the present invention recognize that a hotplug event can be used to trigger a host to read new display characteristic information such as EDID information after either a hotplug event or a switching event. The video graphics switcher may trigger an immediate or delayed input interface hotplug event after detecting a switching event or an output interface hotplug event.

Mechanisms and techniques are also provided for selecting the appropriate action in more complex situations, such as when the switcher has connected one host to multiple display devices with different display characteristic information or different EDID data.

According to various embodiments, the highest preferred resolution or the lowest preferred resolution can be selected. In other examples, an EDID data structure stored could be a hybrid including a combination of preferred and acceptable resolution information. An EDID data structure also contains information about aspect ratio. A video graphics switcher could present a preferred resolution with an aspect ratio common to most of the display devices.

FIG. 1 is a diagrammatic representation showing a basic video graphics switcher. A video graphics switcher 101 includes a switching element 103 that connects hosts 111 and 113 to display devices 121 and 123. According to various embodiments, the switching element is any interconnection mechanism that allows dynamically configurable connection schemes. Display device 121 includes PROM 125 and display device 123 includes PROM 127. In some examples, display devices 121 and 125 are liquid crystal display (LCD) monitors, cathode ray tube (CRT) monitors, or digital projectors. Hosts may be any video source, such as computer or processing systems, audio/video (A/V) receivers, set top boxes, etc. In typical implementations, a PROM 125 has display characteristic information such as an EDID data structure that allows a host to determine capabilities associated with the display device 121. However, video graphics switcher 101 does not pass display characteristic information from PROM 125 and 127 to hosts 111 and 113.

Consequently, hosts 111 and 113 usually assume a safe mode of operation that allows interaction with most display devices. In other instances, the hosts 111 and 113 can obtain some default display characteristic information from a video graphics switch 101. However, the default display characteristic information may not reflect the true capabilities of a display device. Consequently, display devices may be underutilized.

Figure 2:
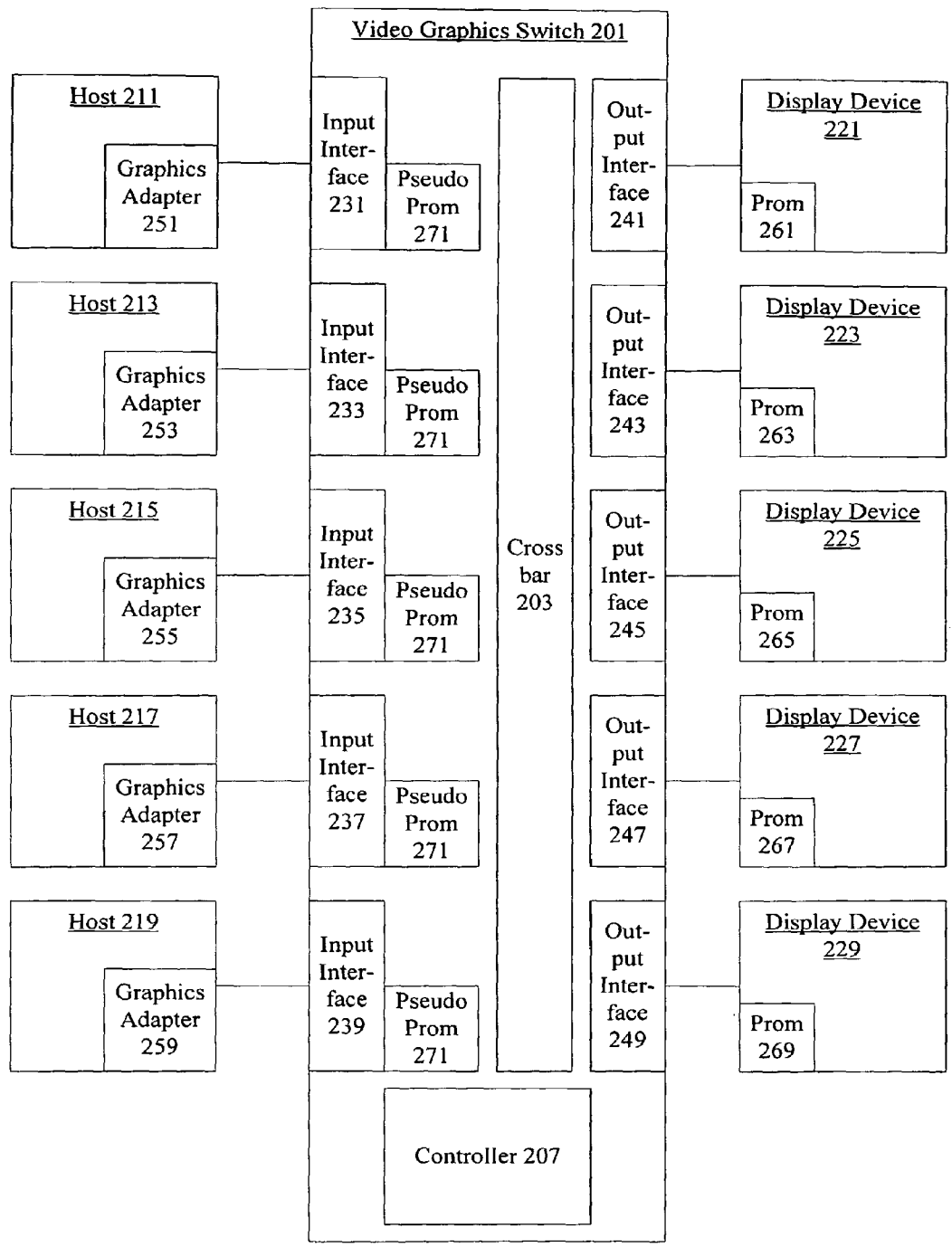
FIG. 2 is a diagrammatic representation showing a video graphics switcher according to various embodiments.

FIG. 2 is a diagrammatic representation showing an intelligent video graphics switch 201. The video graphics switcher 201 is connected to hosts 211, 213, 215, 217, and 219 through input interfaces 231, 233, 235, 237, and 239. According to various embodiments, the input interfaces 231, 233, 235, 237, and 239 are DVI or DVI compatible interfaces. Hosts 211, 213, 215, 217, and 219 include graphics adapters 251, 253, 255, 257, and 259. Graphics adapters 251, 253, 255, 257, and 259 may be separate cards, devices, or even integrated with a host processor.

Output interfaces 241, 243, 245, 247, and 249 are connected to display devices 221, 223, 225, 227, and 229. It should be noted that although direct connection is shown, the video graphics switcher 201 may be connected to the hosts and display devices through one or more other entities such as adapters and converters. Display devices 221, 223, 225, 227, and 229 include PROMs 261, 263, 265, 267, and 269 that include display device characteristic information. In some examples, some display devices may not have PROMs. According to various embodiments, the PROMs hold EDID data structures that specify a variety of display device characteristics. A switching element 203 or interconnect matrix allows dynamically configurable interconnection of the hosts 211, 213, 215, 217, and 219 to the display devices 221, 223, 225, 227, and 229.

A controller 207 maintains mapping information or the appropriate connection configuration. The controller 207 may be a general purpose processor, an Application Specific Integrated Circuit (ASIC), or a programmable device such as an (FPGA) or a programmable controller. The controller 207 also operates to obtain EDID information from PROMS 261, 263, 265, 267, and 269 and provides the data to pseudo PROMs 271, 273, 275, 277, and 279. According to various embodiments, the controller 207 allows the input interfaces 231, 233, 235, 237, and 239 and associated pseudo PROMs 271, 273, 275, 277, and 279 to operate as proxies for display devices 221, 223, 225, 227, and 229. Similarly, the controller 207 allows the output interfaces 241, 243, 245, 247, and 249 to operate as proxies for hosts 211, 213, 215, 217, and 219.

According to various embodiments, the pseudo PROMs 271, 273, 275, 277, and 279 may be implemented as actual separate memory blocks or they may implemented as a block of dynamic random access memory (DRAM) associated with a controller. In some examples, the controller 207 maintains a memory map associating portions of an address space with various input interfaces.

According to various embodiments, the video graphics switcher 201 maintains interconnection information between hosts 211-219 and display devices 221-229. The interconnection information may be manually or automatically configured. It should be further noted that although direct connection is shown between the video graphics switcher 201 and hosts 211-219 and display devices 221-229, a variety of adapters, interfaces, and other switches may exist between the hosts 211-219, the switcher 201, and the display devices 221-229. Based on the interconnection information, the controller 207 obtains display characteristic information from display device PROMS 261-269. The display characteristic information is then provided in psuedo PROMs 271-279 for the corresponding connected hosts 221-219. In some instances, a single host can be connected to multiple display devices. According to various embodiments, the pseudo PROM for the single host connected to multiple display devices would be populated with EDID information supported by the multiple display devices. In another example, the pseudo PROM for the single host would be populated with basic EDID information. In other examples, a user can configure the type of information provided to the pseudo PROM.

In some examples, a video graphics switcher 201 can even determine display device characteristics and select the optimal connection pattern based on display characteristics. In some instances, display devices with similar EDIDs are connected to the same host where desired. A video graphics switcher 201 can also obtain information about graphics adapters 251-259 either manually or automatically and suggest optimal pairings of hosts and display devices.

According to various embodiments, the input interfaces 231, 233, 235, 237, and 239 and the output interfaces 241, 243, 245, 247, and 249 are DVI based interfaces that include Hotplug and DDC support. In other examples, the input interfaces 231, 233, 235, 237, and 239 and the output interfaces 241, 243, 245, 247, and 249 are HDMI based interfaces that include Hotplug, DDC, and audio support.

Figure 3:
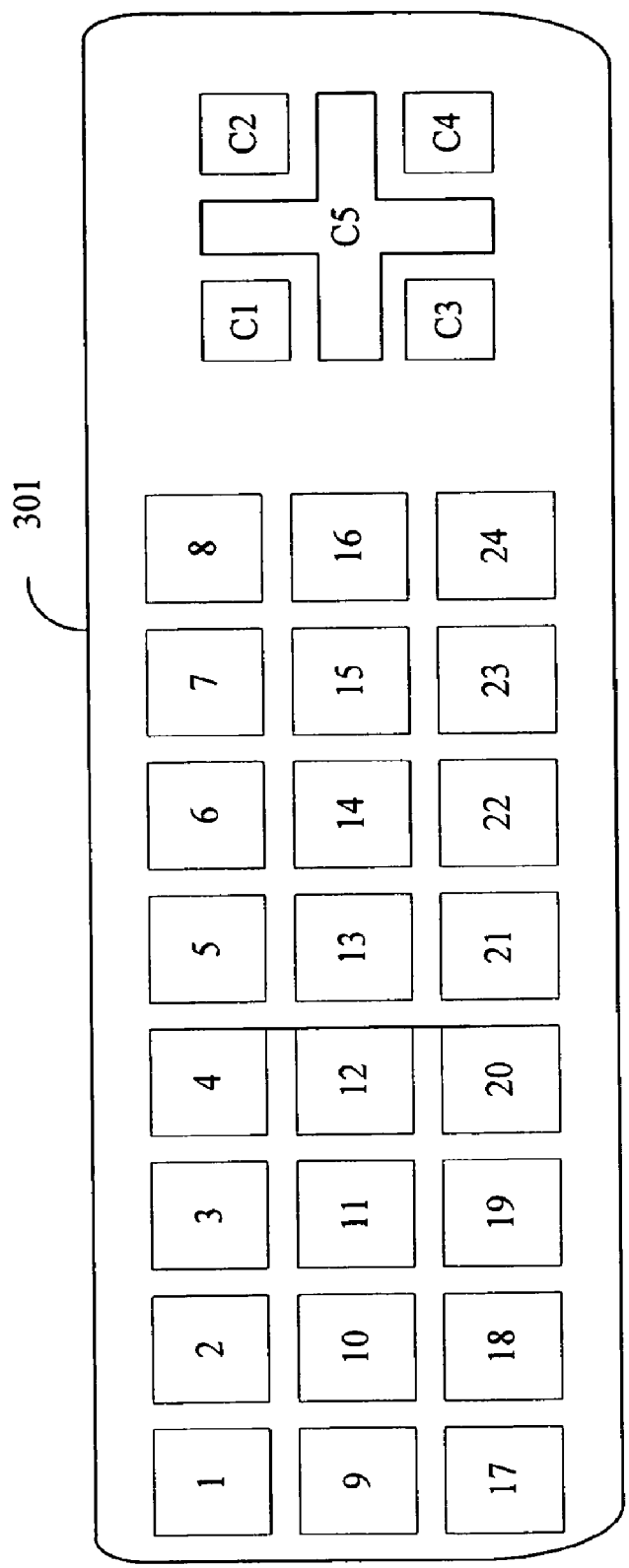
FIG. 3 is a diagrammatic representation showing a DVI connector.

FIG. 3 is a diagrammatic representation showing a DVI connector 301. DVI is a video interface standard designed to improve the image quality of devices including LCD monitors and digital projectors. Unlike conventional analog signals that may be distorted by various forms of noise, DVI associates a discrete brightness value with each pixel for particular discrete time blocks.

DVI includes a DDC channel and a Transition Minimized Differential Signaling (TDMS) channel, as well as a few legacy and optional channels The TDMS channel carries video and auxiliary data. A single DVI link includes four twisted pairs of wire (red, green, blue, and clock) that allow transmission of 24 bits per pixel. The timing of the signal is similar to that of an analog signal. Data is transmitted at high rates without packetization and without error correction. Typical cable lengths are relatively short because of the lack of error correction. Consequently, use of DVI and other digital video standards have been limited. Images are transmitted line by line with blanking intervals between each line and each frame.

The DDC channel includes pin 6 used for DDC clock and pin 7 used for DDC data. The DDC channel allows a source to obtain capabilities of a device such as a display device. According to various embodiments, it is contemplated that the capabilities of a graphics adapter can also be obtained by querying a host using a channel like DDC.

A DVI Hotplug detection pin 16 allows a switch or a host to identify connection or disconnection events. Some video interfaces have a hotplug mechanism, such as the Hotplug detection mechanisms provided in DVI, to determine when a display device is being added or removed. It should be noted that any general connection or disconnection event is referred to herein using a lowercase hotplug term, while a specific protocol hotplug event such as DVI Hotplug is referred to herein using an uppercase Hotplug term. According to various embodiments, a hotplug event causes the reloading of a switcher display characteristic information memory or table entry and triggers a corresponding host to read updated display characteristic information from an associated input interface. A hotplug event causes a break in the image from most sources. Consequently, any forced input hotplug event accompanying a change of an input interface pseudo PROM is optional and under user control. According to various embodiments, any user-initiated change of connection pattern in the switcher also causes immediate or deferred hotplug events. The connector 301 also includes pins C1, C2, C3, C4, and C5 for allowing transmission of legacy analog signals. It should be noted that multiple DVI links can be used with a single display device.

Pin assignments are shown as follows:
1 TMDS Data 2−Digital red−(Link 1)
2 TMDS Data 2+Digital red+(Link 1)
3 TMDS Data 2/4 shield
4 TMDS Data 4−Digital green−(Link 2)
5 TMDS Data 4+Digital green+(Link 2)
6 DDC clock
7 DDC data
8 Analog Vertical Sync
9 TMDS Data 1−Digital green−(Link 1)
10 TMDS Data 1+Digital green+(Link 1)
11 TMDS Data 1/3 shield
12 TMDS Data 3−Digital blue−(Link 2)
13 TMDS Data 3+Digital blue+(Link 2)

Figure 4:
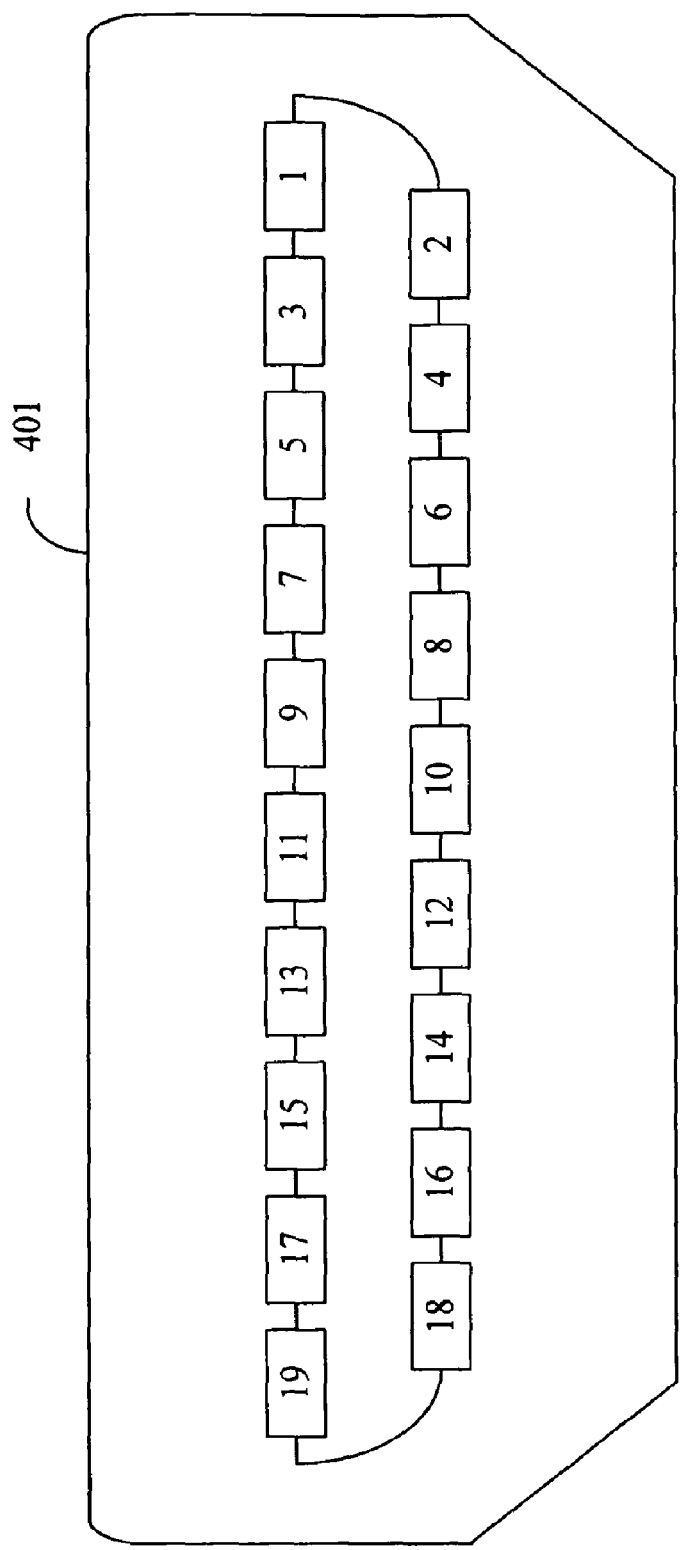
FIG. 4 is a diagrammatic representation showing an HDMI connector.

14 +5V Power for monitor when in standby
15 Ground Return for pin 14 and analog sync
16 Hot Plug Detect
17 TMDS data 0−Digital blue−(Link 1) and digital sync
18 TMDS data 0+Digital blue+(Link 1) and digital sync
19 TMDS data 0/5 shield
20 TMDS data 5−Digital red−(Link 2)
21 TMDS data 5+Digital red+(Link 2)
22 TMDS clock shield
23 TMDS clock+Digital clock+(Links 1 and 2)
24 TMDS clock−Digital clock−(Links 1 and 2)
C1 Analog Red
C2 Analog Green
C3 Analog Blue
C4 Analog Horizontal Sync
C5 Analog Ground Return for R, G and B signals FIG. 4 is a diagrammatic representation showing an HDMI connector 401. The High-Definition Multimedia Interface (HDMI) is digital audio/video interface. HDMI provides an interface between any host and display device. HDMI supports standard, enhanced, or high-definition video and multi-channel digital audio on a single cable. HDMI is compatible with some versions of DVI. HDMI includes a TDMS channel with up to eight audio channels, a DDC channel, Hotplug support, a consumer electronics control (CEC) channel, etc.

The HDMI TDMS channel carries video and auxiliary data and is similar to a DVI TDMS channel. A single HDMI link includes four twisted pairs of wire (red, green, blue, and clock) that allow transmission of 24 bits per pixel. The timing of the signal is similar to that of an analog signal. Data is transmitted at high rates without packetization and without error correction. Images are transmitted line by line with blanking intervals between each line and each frame.

The DDC channel includes pin 15 used for DDC clock and pin 16 used for DDC data. The DDC channel allows a source to obtain capabilities of a device such as a display device. In many embodiments, the DDC channel is implemented using an inter-integrated circuit ($I^2C$) bus. According to various embodiments, it is contemplated that the capabilities of a graphics adapter can also be obtained by querying a host using a channel like DDC.

The CEC channel uses the industry standard AV Link protocol and provides remote control functions. An HDMI Hotplug detection pin 19 allows a switch or a host to identify connection or disconnection events. It should be noted that multiple DVI links can be used with a single display device.

Pin assignments are shown as follows:
1 TMDS Data 2+
2 TMDS Data 2 Shield
3 TMDS Data 2−
4 TMDS Data 1+
5 TMDS Data 1 Shield
6 TMDS Data 1−
7 TMDS Data 0+
8 TMDS Data 0 Shield
9 TMDS Data 0−
10 TMDS Clock+
11 TMDS Clock Shield
12 TMDS Clock−
13 CEC
14 No Connect
15 DDC Clock
16 DDC Data
17 Ground
18 +5V Power
19 Hot Plug Detect
20 SHELL Although DVI and HDMI are described herein, it should be noted that a variety of video interfaces can be used to implement the techniques of the present invention. According to various embodiments, any interface allowing a host to obtain display characteristic information from a display device through the interface can be used.

FIG. 5 is a diagrammatic representation showing display device characteristic information that can be obtained over an interface. One example of display device characteristic information is an EDID data structure. According to various embodiments, the DDC channel for transmitting the EDID from the display to the host is implemented using the $I^2C$ bus, although different buses can be used. The EDID is often stored in a display device PROM or electrically erasable PROM (EEPROM) that is compatible with the $I^2C$ bus.

However, even without a construct like an EDID data structure, it may be possible to obtain signal parameters such as timing from a display device. For example, timing and signaling parameters can be obtained from a display device by a switcher and organized into an EDID data structure for a host to read from a switcher pseudo PROM.

A display device characteristic information structure 501 typically includes header information 501, serial number data 503, version/revision number information 505, display parameters 507, image size support 511, power management support 513, chroma information 515, established timing 517, a descriptor block 521, supported video modes 523, and display device manufacturer information 525.

According to various embodiments, the header information 501 identifies a data structure as EDID. The serial number data 503 provides product identifiers specified by a manufacturer. The version/revision number 505 shows version information. The display parameters 507 indicate video input definition. Image size support 511 shows valid image size ranges. Power management support 513 is used to indicate support for power management features such as standby and sleep modes. Chroma information 515 indicates phosphor or filter chromaticity. Established timing 517 shows factory supported timing modes. For example, timing modes include 800×600@72 Hz, 800×600@75 Hz, 832×624@75 Hz, 1024×768@87 Hz (Interlaced), 1024×768@60 Hz, 1024×768@70 Hz, 1024×768@75 Hz, and 1280×1024@75 Hz. Descriptor block 521 can be used for a range of purposes including providing more detailed timing information. Multiple descriptor blocks may be provided. Supported video modes 523 show supported modes and the device manufacturer information 525 identifies a maker.

Although one example of a display characteristic information structure is shown, a wide variety can be used. Some may include only basic information. For example, a single identifier may be the only information included in a PROM and the single identifier may be used by a host to obtain complete information about a display device from a database or network. In other examples, additional parameters may be specified in a display characteristic information structure.

FIG. 6 is a diagrammatic representation showing a mapping table. A mapping table is one example of a mechanism a switcher can use to maintain connection information. Mapping table 601 indicates that hosts 611, 613, 615, 617, and 619 are mapped to display devices 621, 623, 625, 627, and 629 respectively. In some examples, a single entity may be mapped to multiple entities. For example, a single host may be mapped to multiple display devices.

According to various embodiments, the mapping table 601 also includes information on where to find display characteristic information. Any memory used to store display characteristic information for a display device connected to a switcher is referred to herein as a pseudo PROM. According to various embodiments, the pseudo PROM is read by a host as though it were the PROM included in a display device. In one example, a pseudo PROM may be implemented as a portion of memory included in one of the address ranges 631, 633, 635, 637, or 639. In another example, actual discrete memory blocks may be used and memory address ranges may not be included in a mapping table 601. In still another example, display characteristic information such as EDID information is stored in the mapping table 601 itself. Although a table is provided, a wide variety of data structures can be used to associate hosts with display devices.

Figure 7:
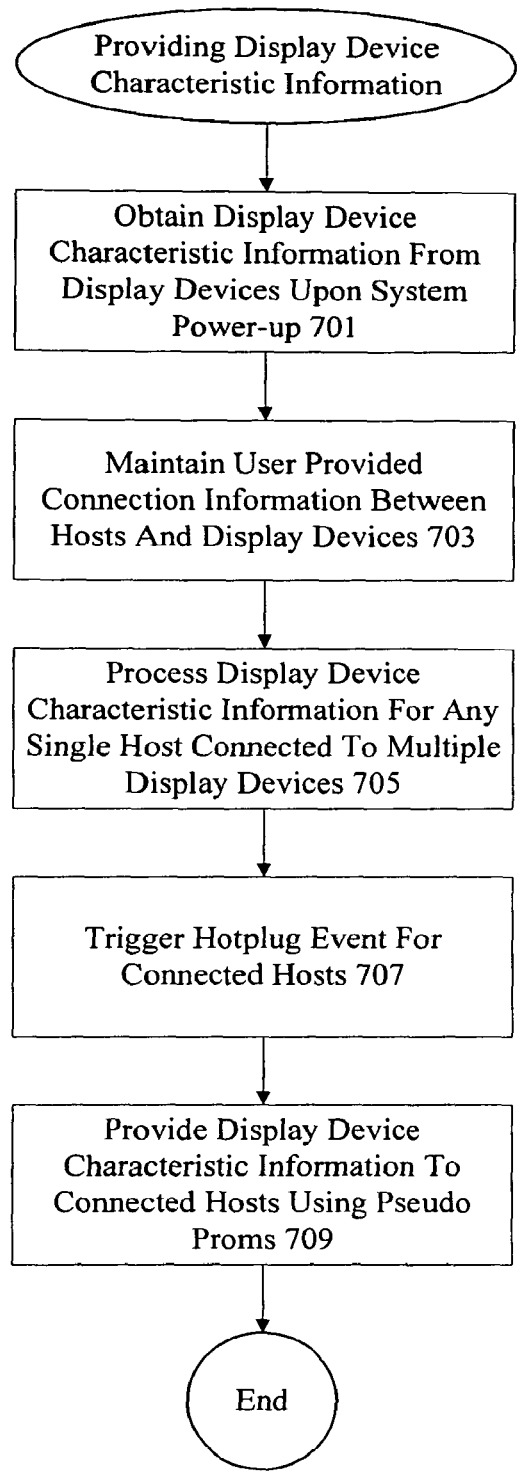
FIG. 7 is a flow process diagram showing a technique for obtaining display device characteristic information from a display device.

FIG. 7 is a flow process diagram showing one technique for providing display device characteristic information. At 701, display device characteristic information is obtained from display devices upon system power-up. Obtaining display device characteristic information may entail obtaining EDID information from PROMs associated with the display devices over a DDC channel. In some instances, if not EDID information is available, signaling and timing information can still be obtained. The resolutions and timings observed can be assembled into an EDID-like data structure. Alternatively, the structure contents could be limited to the resolutions and timings observed between two successive host-initiated hotplug events. If a switcher is also able to obtain information about a host graphics adapter, the information about the host graphics adapter can be used to further modulate the information maintained by the switcher.

At 703, the switcher maintains user provided connection information between hosts and display devices. According to various embodiments, a user configures a connection pattern for the hosts and display devices. In other examples, a switcher can suggest or even automatically configure a connection configuration based on known or shared capabilities of the display devices and hosts. For example, if one host needs to be connected to two display devices, two display devices having similar EDID information are selected for the host. If host graphics adapter information is obtained, hosts can be matched with display devices that have similar capabilities and characteristics.

At 705, display device characteristic information for any single host connected to multiple display devices is processed. Processing may be performed by control logic included in a video graphics switcher. The control logic can be configured with a user specified set of rules or a default set of rules for intelligently resolving conflicts. For example, if two monitors both support a lower resolution but only one supports a higher resolution, the lower resolution is used to populate an EDID for the pseudo PROM for the corresponding host. In another example, a higher or middle resolution is selected. A hotplug event is then triggered for the connected hosts at 707. The hotplug event prompts the hosts to read the display device characteristic information at 709.

Figure 8:
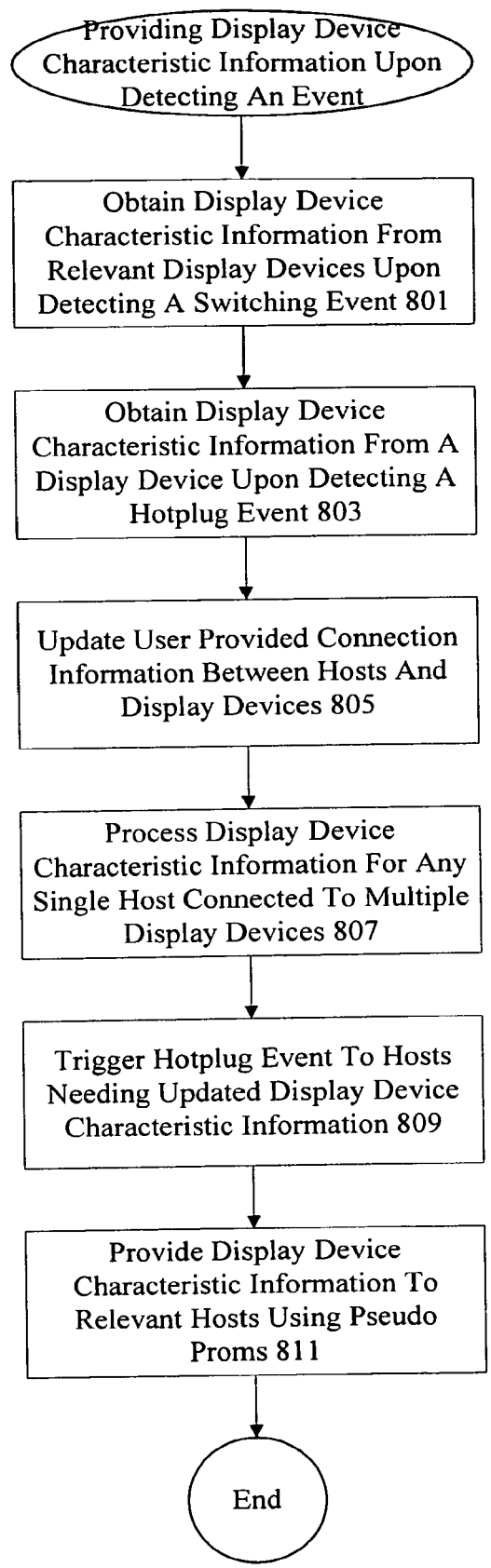
FIG. 8 is a flow process diagram showing a technique for providing display device characteristic information to a host.

FIG. 8 is a flow process diagram showing one technique for providing display device characteristic information upon detecting an event. At 801, display device characteristic information is obtained from display devices upon detecting a switching event. A switch event may involve a user initiated connection pattern change. Information may also be obtained by the switcher upon detecting a hotplug event 803. In still other examples, display characteristic information is obtained from display devices periodically. Obtaining display device characteristic information may entail obtaining EDID information from a PROMs associated with the display devices over a DDC channel. If a switcher is also able to obtain information about a host graphics adapter, the information about the host graphics adapter can be used to further modulate the information maintained by the switcher.

At 805, the switcher updates user provided connection information between hosts and display devices. At 807, display device characteristic information for any single host connected to multiple display devices is processed. The switcher can be configured with user defined rules or user provided data. For example, an EDID associated with a display device may not accurately reflect the capabilities of a display device. Consequently, a switcher may maintain user configured EDID information for the display device. In another example, a user defined set of rules can be used for conflict resolution. For example, if multiple display devices are connected to a single host graphics adapter, a user defined set of rules may select a medium resolution or even a default resolution. A hotplug event is then triggered for hosts needing updated display device characteristic information 809. The hotplug event prompts the hosts to read the display device characteristic information at 809.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A device, comprising:
a switching element configured to connect a plurality of hosts to a plurality of display devices;
control logic operable to map a host from the plurality of hosts to a display device from the plurality of display devices, wherein the control logic is operable to generate an immediate or delayed hotplug event after detecting a switching event or a display device hotplug event and signal the hotplug event to the host to provide the host with display device characteristic information associated with the display device.

2. The device of claim 1, wherein the plurality of hosts include a plurality of graphics adapters.

3. The device of claim 1, wherein the device is a video graphics switcher.

4. The device of claim 1, wherein the plurality of display devices are associated with a plurality of Digital Visual Interfaces (DVI).

5. The device of claim 4, wherein display device characteristic information is Extended Display Identification Data (EDID).

6. The device of claim 5, wherein the display device characteristic information is obtained over a Display Data Channel (DDC).

7. The device of claim 1, wherein the display device characteristic information is stored in memory associated with control logic.

8. The device of claim 1, wherein the display device characteristic information stored in memory associated with control logic is user configurable.

9. The device of claim 8, wherein the display device characteristic information stored in memory is accessible even when one or more of the plurality of display devices are disconnected.

10. The device of claim 1, wherein the display device characteristic information is obtained from programmable read only memories (PROMs) associated with the plurality of display devices and stored in pseudo PROMs included in the device.

11. The device of claim 10, wherein the switching event is a user initiated connection change between the host and the display device.

12. The device of claim 10, wherein the switching event triggers a deferred or immediate hotplug event on the input interface.

13. The device of claim 10, wherein the control logic is configured with a user specified set of rules for conflict resolution.

14. An apparatus, comprising:
   interconnection means for connecting a plurality of hosts to a plurality of display devices;
   control means for mapping map a host from the plurality of hosts to a display device from the plurality of display devices, wherein the control means logic is operable to generate an immediate or delayed hotplug event after detecting a switching event or a display device hotplug event and signal the hotplug event to the host to provide the host with display device characteristic information associated with the display apparatus.

15. The apparatus of claim 14, wherein the plurality of hosts include a plurality of graphics adapters.

16. The apparatus of claim 14, wherein the apparatus is a video graphics switcher.

17. The apparatus of claim 14, wherein the plurality of display devices are associated with a plurality of Digital Visual Interfaces (DVI).

18. The apparatus of claim 17, wherein display device characteristic information is Extended Display Identification Data (EDID).

19. The apparatus of claim 18, wherein the display device characteristic information is obtained over a Display Data Channel (DDC).

20. The apparatus of claim 14, wherein the display device characteristic information is stored in memory associated with control means.

21. The apparatus of claim 14, wherein the display device characteristic information stored in memory associated with control means is user configurable.

22. The apparatus of claim 21, wherein the display device characteristic information stored in memory is accessible even when one or more of the plurality of display devices are disconnected.

23. A method, comprising:
   mapping an input interface associated with a host to an output interface associated with a display device; and
   sending processed display device characteristic information to the host by generating and triggering a hotplug event on the input interface, wherein the hotplug event is generated and triggered at the input interface after detecting a switching event or an output interface hotplug event, wherein control logic is configured to maintain display device resolution and timing information observed for successive hotplug events.

\* \* \* \* \*